Figure 1:
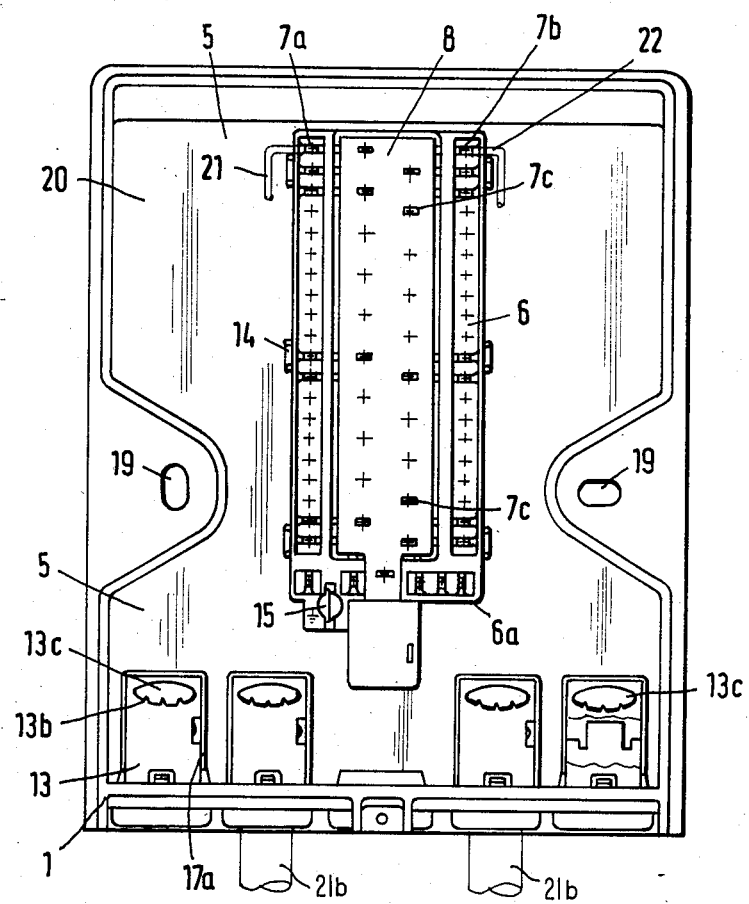

United States Patent [19]

Taybl et al.

[11] Patent Number: 4,607,135

[45] Date of Patent: Aug. 19, 1986

[54] CABLE DISTRIBUTION HEAD WITH LSA-PLUS TERMINATION TECHNIQUE

[75] Inventors: Christa Taybl; Dieter Gerke, both of Berlin; Fritz E. Koch, Schalksmühle; Gerhard Schwenda, Grosshabersdorf, all of Fed. Rep. of Germany

[73] Assignee: Krone GmbH, Berlin, Fed. Rep. of Germany

[21] Appl. No.: 577,285

[22] Filed: Feb. 6, 1984

[30] Foreign Application Priority Data

Feb. 23, 1983 [DE] Fed. Rep. of Germany ....... 3306263

[51] Int. Cl.$^4$ .................................. H02G 15/06
[52] U.S. Cl. ..................... 174/60; 339/103 R; 339/198 R; 361/426
[58] Field of Search .................. 174/60, 44, 59; 361/119, 426; 339/14 L, 14 P, 14 R, 18 R, 143 R, 147 R, 198 R, 97 R, 103 R, 104 R

[56] References Cited

FOREIGN PATENT DOCUMENTS 3007458 9/1981 Fed. Rep. of Germany .
2816724 7/1982 Fed. Rep. of Germany .
2060267 4/1981 United Kingdom .

Primary Examiner—Arthur T. Grimley
Assistant Examiner—D. A. Tone
Attorney, Agent, or Firm—Baker, Maxham & Jester

[57] ABSTRACT

The subject matter of the invention is formed by a cable distribution head with LSA-PLUS termination technique for terminating incoming and outgoing communications cables. LSA-PLUS termination technique means "solderless, non-screwed and non-stripped termination with polytropic air gap".

In the housing (1) of the cable distribution head, which may be closed by a slip cover (4) adapted to be latched in the open and the closed state by means of projections (2, 3), there are provided a latchable LSA-PLUS terminal block (6) loaded with LSA-PLUS terminals (7a, 7b) disposed on the ends of a bar (7), there being provided between the LSA-PLUS terminals (7a, 7b) associated with the incoming and the outgoing communications cables (21, 22) an open-topped chamber (8) for receiving an overvoltage arrester magazine (9), further a clamping means (15) disposed on the end face (6a) of the LSA-PLUS terminal block (6) for solderless and non-screwed termination of an earth wire (16), a self-supporting shield contact member formed as a U-shaped metal clip (10) with contacting teeth (11) and a clip spring (12) adapted to be clamped into the metal clip (10), and a self-supporting strain relief means consisting of a clamping spring (13) adapted to be latched into the housing (1) and formed with a resilient lug (13a).

18 Claims, 5 Drawing Figures

CABLE DISTRIBUTION HEAD WITH LSA-PLUS TERMINATION TECHNIQUE

The invention relates to a cable distribution head with solderless, non-screwed and non-stripped, plytropic air gap termination technique (=LSA-PLUS termination technique) for terminating incoming and outgoing communications cables, comprising for the cables leading into and out of the interior of a housing bottom part an LSA-PLUS terminal block including an overvoltage arrester magazine adapted to be plugged thereon, a shield contact member, an earth wire contact member, and a strain relief means.

The applicant developed a termination technique for solderless, non-screwed and non-stripped termination of insulated conductor wires to terminal elements, which in the meantime has become widely accepted under the name LSA-PLUS termination technique.

This LSA-PLUS technique—in which PLUS is short for polytropic air gap—is also employed in the subject matter of the present invention for terminating the incoming and outgoing cables. An LSA terminal is one which makes solderless, non-screwed and non-stripped termination with an insulative wire. An LSA-PLUS terminal is of the same type where the terminal slot plane is oriented at an angle of 45° to the wire axis.

From the DE-PS No. 2,816,724 a connecting and distribution box for communications cables including an LSA terminal block has been known.

Here, an LSA terminal block loaded with solderless, non-screwed and non-stripped terminal elements is disposed in the distribution box.

Moreover, ribs are integrally formed in the housing bottom part, into which ribs the tension springs for strain relief of the cables engage.

Clamping devices are provided for securing and earthing the cable shield and the supplementary earth wires of the cables, respectively.

The drawbacks of the known arrangement reside in that the LSA terminal block cannot accommodate an overvoltage arrester magazine loaded with replaceable and commercially available discharge cartridges, and that the strain relief according to the DE-PS No. 2,816,724 acts directly on the housing and is suitable only for a certain cable diameter, and that the securing and earthing of the cable shield is time-consuming, because a screwed connection is required.

The present invention is based on the object of avoiding the above-mentioned drawbacks, i.e., of enabling in a cable distribution head of the type specified above the accommodation of an overvoltage arrester magazine, an improved strain relief even for different cable diameters, and a simplified mounting and earthing of the cable shield.

In accordance with the invention the above-specified object is solved in that in the housing of the cable distribution head, which may be closed by a slip cover adapted to be latched in the open and the closed state by means of projections, there are provided a latchable LSA-PLUS terminal block loaded with LSA-PLUS terminals disposed on the ends of a bar, there being provided between the LSA-PLUS terminals associated with the incoming and the outgoing communications cables an open-topped chamber for receiving an overvoltage arrester magazine, further a clamping means disposed on the end face of the LSA-PLUS terminal block for solderless and non-screwed termination of an earth wire, a self-supporting shield contact member formed as a U-shaped metal clip with contacting teeth and a clip spring adapted to be clamped into the metal clip, and a self-supporting strain relief means consisting of a clamping spring adapted to be latched into the housing and formed with a resilient lug.

Advantageously, the LSA-PLUS terminal block may be latched onto a rear wall of the housing with the aid of detents which snap-engage into openings.

Suitably, a contact lug is disposed on an intermediate portion of the bar, which lug is inserted into the overvoltage arrester magazine through an aperture for electrical connection to a discharge contact.

Appropriately, the clamping means consists of a clip spring, a receiving member formed with a groove, and an aperture through which the earth wire is inserted.

Suitably, the metal clip is formed with an extension projecting into the clip spring.

Advantageously, the clamping spring is formed with an opening having clamping teeth.

Appropriately, the clamping spring is held with one end thereof in a latching means and with its other end in a space formed in the housing.

Suitably, the resilient lug is formed with bent tabs.

Advantageously, the slip cover cooperates with a housing top portion to form labyrinth seals.

Advantageously, bores for mounting to a pole or wall are provided outside of a switch space.

Suitably, a chamber wall formed adjoining the chamber inhibits wrong application of an applicator tool.

The following advantages are achieved with the cable distribution head according to the present invention:

1. The depth of the housing is surprisingly small in spite of the overvoltage arrester magazine plugged thereon.

2. By the definition of a chamber the mounting position of the LSA-PLUS overvoltage arrester magazine is determined; it cannot be plugged in the wrong way.

3. The shield contact member of the communications cable is self-supporting. When the contact is made no forces will be produced which would have to be accommodated by the housing wall portions.

4. The strain relief means is self-supporting and of a design such that even different cable diameters will be securely retained.

5. The earth wire is terminated in a solderless and non-screwed way.

6. The switch space may be made splash proof by means of labyrinth seals.

7. The bolts for mounting to a pole or wall need not be sealed because they may be disposed outside of the switch space.

Figure 2:
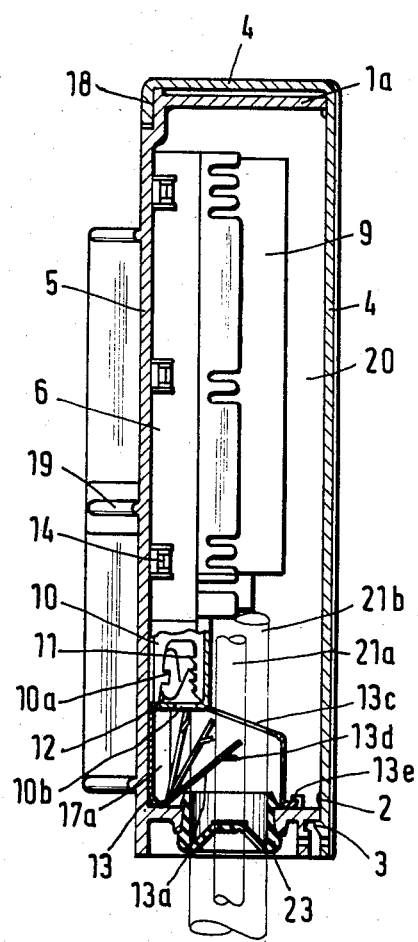
Figure 3:
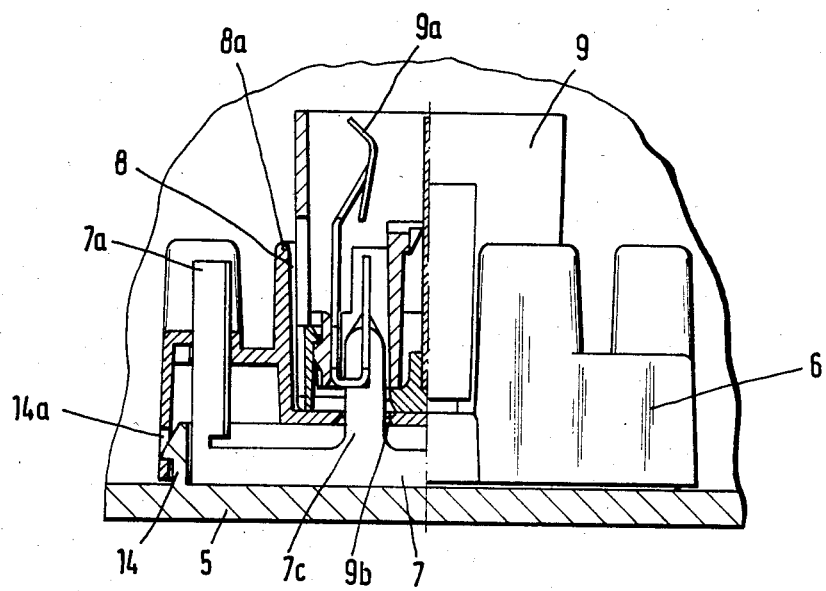
Figure 4:
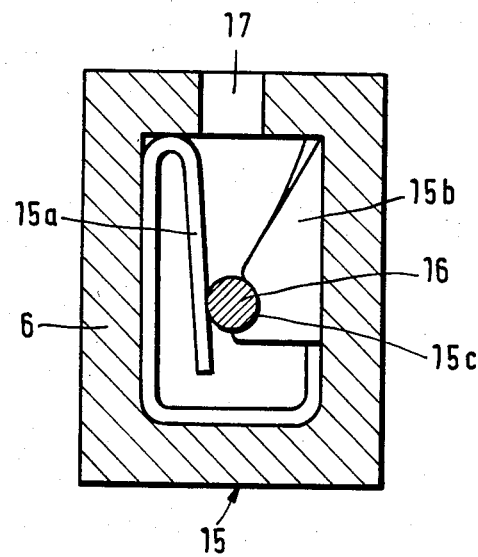
Figure 4A:
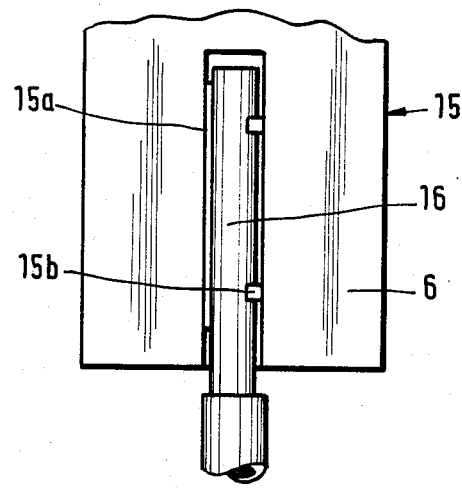

An embodiment of the invention will be described in detail with reference to the drawing, in which:

FIG. 1 is a front view of the cable distribution head with the slip cover being removed, FIG. 2 is a sectional side view of the cable distribution head, FIG. 3 is the LSA-PLUS-terminal block with an overvoltage arrester magazine plugged thereon, FIG. 4 is a sectional view of the clamping means for the earth wire, and FIG. 4a is a plan view according to FIG. 4.

As shown in FIG. 1, the incoming and the outgoing communications cables 21, 22 are run to an LSA-PLUS terminal block 6 and are connected to the LSA-PLUS terminals 7a, 7b in a solderless, non-screwed and non-stripped manner.

As is also shown in FIG. 3, a bar 7 has been inserted into the LSA-PLUS terminal block 6.

At its ends, the bar 7 is provided with the LSA-PLUS-terminals 7a, 7b, and intermediate the same it is provided with a contact lug 7c. This contact lug 7c is inserted through the aperture 9b into an overvoltage arrester magazine 9 whereby an electrical connection to the discharge terminal 9a thereof is made. The discharge terminal 9a is used for receiving arrester cartridges (not shown).

The LSA-PLUS terminals 7a, 7b are disposed at a sufficient distance from each other so that the overvoltage arrester magazine 9 may be inserted therebetween into a chamber 8 whereby a small structural height results.

By the formation of this open-topped chamber 8 the position of the overvoltage arrester magazine 9 is determined; it cannot be inserted the wrong way.

Moreover, the chamber wall 8a prevents wrong application of an applicator tool (not shown) for the LSA-PLUS terminals.

As will be apparent especially from FIG. 3, the LSA-PLUS terminal block 6 may be latched to the rear wall 5 of the housing 1 with the aid of detents 14 which snapengage in openings 14a.

As shown in FIG. 1, clamping means 15 for connection of an earth wire 16 (FIG. 4, 4a) is disposed on the end face 6a of the LSA-PLUS terminal block 6.

In FIGS. 4 and 4a the clamping means 15 is shown at an enlarged scale.

The earth wire 16 is inserted from above through the aperture 17 and is urged with the aid of a blade (not shown) between a clip spring 15a and a receiving member 15b which is formed with a groove 15c. For removing the earth wire 16, the clip spring 15a is released by turning the blade inserted through the aperture 17 so that the earth wire 16 may be withdrawn axially.

FIG. 2 shows a side view of the cable distribution head. The housing 1 of the distribution head may be closed by a slip cover 4 adapted to be latched in its open and closed state by means of protrusions 2, 3. The slip cover 4 may also be removed when the latching force has been overcome.

In the closed state the slip cover 4 cooperates with the housing top part 1a to form labyrinth seals 18, whereby the switch space 20 is made splash-proof. As is further shown in FIG. 2, a self-supporting shield contact member is provided in the lower part of the housing 1.

A portion of a laminated sheath, i.e., of an aluminium-coated plastic sheath of a cable, is pushed through the aperture 10b.

A metal clip 10 formed with contacting teeth 11 has an extension 10a. A clip spring 12 is fitted onto said extension and is thereby held in its position.

The clip spring 12 clamps the laminated sheath (not shown) against the contacting teeth 11, thereby making electrical contact.

When tension is applied to the cable 21a, 21b, the contacting teeth 11 will bite into the sheath, make contact therewith and prevent slipping-out of the same.

Due to the U-shaped design of the shield contact no forces will be produced upon application of the layered-sheath cable which would have to be accommodated by portions of the housing walls.

Moreover, a self-supporting strain relief means is shown comprising a clamping spring 13 retained with one end thereof in a latching means 13e and with its other end in a space 17a formed in the housing 1.

The clamping spring 13 also has an aperture 13c provided with clamping teeth 13b.

A resilient lug 13a is turned back at the other end of the clamping spring 13.

A thin or a thick cable 21a, 21b will be urged by means of the resilient lug 13a towards the clamping teeth 13b of the aperture 13c.

When tension is applied to the cable, the resilient lug 13a, which is positioned at an angle to the longitudinal axis of the thin or the thick cable 21a, 21b, is drawn into the thin or the thick cable 21a, 21b to thereby increase the pressure acting on the clamping teeth 13b.

In the case of thin cables 21a, the intermediate portion of the resilient lug 13a will be effective.

In the case of thicker cables 21b the repeatedly bent tabs 13d of the resilient lug will be in engagement so that the required angle to the cable axis will be maintained also when the tab is deflected to an increased extent.

For releasing, the resilient lug 13a is formed with a bore (not shown). By pressing the releasing portion of the LSA-PLUS tool inwardly it is possible to urge the tab rearwardly and to withdraw the thin or the thick cable 21a, 21b.

Moreover it is apparent from FIGS. 1 and 2 that the bores 19 formed for mounting to a pole or wall are disposed outside of the switch space 20 and that therefore the bolts (not shown) are not sealed.

By inserting a sealing plug 23 the inserted cable 21a, 21b is sealed and at the same time removal of the clamping spring 13 is inhibited.

We claim:

1. A cable distribution head comprising:
    a housing (1) having a rear wall (5) and formed with a switch space (20);
    a terminal block (6) mounted in said housing, said terminal block having a plurality of solderless, non-screwed and non-stripped, polytropic air gap LSA-PLUS terminals (7a, 7b) arranged in spaced rows, said terminals being adapted to provide termination for a plurality of incoming and outgoing communication cables (21, 22), said terminal block comprising:
    a plurality of conductive bars (7), each interconnecting two of said terminals;
    an open-topped chamber (8) extending into said terminal block, said chamber being adapted to receive an overvoltage arrester magazine; and
    clamping means (15) disposed on one end face (6a) of said terminal block, said clamping means being adapted to terminate an earth wire in a solderless and non-screwed manner;
    a self-supporting shield contact member formed as a U-shaped metal clip (10) formed with contacting teeth (11) and having a clip spring (12) adapted to be clamped to said metal clip; and
    self-supporting strain relief means comprising a clamping spring (13) adapted to be latched into said housing and formed with a resilient lug (13a).

2. Cable distribution head as claimed in claim 1, wherein said LSA-PLUS terminal block (6) is latched onto said rear wall (5) of the housing (1) with the aid of detents (14) which snap-engage in openings (14a).

3. Cable distribution head as claimed in claim 1, wherein each said bar (7) is provided, on an intermediate portion thereof with a contact lug (7c) adapted to be inserted into the overvoltage arrester magazine for electrical connection to a discharge contact.

4. Cable distribution head as claimed in claim 1, wherein said clamping means (15) consists of a clip spirng (15a), a receiving member (15b) formed with a groove (15c), and an aperture (17) through which the earth wire is adapted to be inserted.

5. Cable distribution head as claimed in claim 1, wherein said metal clip (10) is formed with an externsion (10a) projecting into the clip spring (12).

6. Cable distribution head as claimed in claim 1, wherein said clamping spring (13) is formed with an opening (13c) with clamping teeth (13b).

7. Cable distribution head as claimed in claim 6, wherein said clamping spring (13) is held with one end thereof in a latching means (13e) and with its other end in a space (17a) formed in the housing (1).

8. Cable distribution head as claimed in claim 7, wherein said resilient lug (13a) is formed with bent tabs (13d).

9. Cable distribution head as claimed in claim 1, wherein said housing is formed with bores (19) for mounting to an external surface, said bores being provided outside of said switch space (20).

10. Cable distribution head as claimed in claim 1 wherein said terminal block is formed with a chamber wall (8a) formed adjoining the chamber (8) to inhibit wrong application of an applicator tool.

11. Cable distribution head as claimed in claim 1, and further comprising a slip cover (4) formed with protrusions (2,3), said protrusions cooperating with said housing to permit said slip cover to be selectively latched in the open and in the closed position.

12. Cable distribution head as claimed in claim 11, wherein said slip cover (4) cooperates with a housing top portion (1a) to form labyrinth seals (18).

13. A cable distribution head comprising:
a housing (1); and
a terminal block (6) mounted in said housing, said terminal block having a plurality of solderless, non-screwed and non-stripped, polytropic air gap LSA-PLUS terminals (7a, 7b) arranged in spaced rows, said terminals being adapted to provide termination for a plurality of incoming and outgoing communication cables (21, 22), said terminal block comprising:
a plurality of conductive bars (7), each interconnecting two of said terminals and being formed with a contact lug (7c) intermediate its ends; and
an open-topped chamber (8) extending into said terminal block, said chamber being adapted to receive an overvoltage arrester magazine, said contact lugs extending into said chamber.

14. Cable distribution head as claimed in claim 13, and further comprising clamping means (15) disposed on one end face (6a) of said terminal block, said clamping means comprising a clip spring (15a), a receiving member (15b) formed with a groove (15c), and an aperture (17) through which an earth wire is adapted to be inserted, said clamping means being adapted to terminate the earth wire in a solderless and non-screwed manner.

15. Cable distribution head as claimed in claim 13, and further comprising a self-supporting shield contact member formed as a U-shaped metal clip (10) formed with contacting teeth (11) and an extension (10a) and having a clip spring (12) adapted to be clamped to said metal clip, said extension projecting into said clip spring.

16. Cable distribution head as claimed in claim 13, and further comprising self-supporting strain relief maans comprising a clamping spring (13) adapted to be latched into said housing and formed with a resilient lug (13a) and an opening (13c) with clamping teeth (13b).

17. Cable distribution head as claimed in claim 16, wherein said clamping spring (13) is held with one end thereof in a latching means (13e) and with its other end in a space (17a) formed in said housing (1).

18. Cable distribution head as claimed in claim 13, wherein said contact lug (7c) is adapted to be inserted into the overvoltage arrester magazine for electrical connection to a discharge contact therein.

* * * * *